March 3, 1970     H. M. MORROW     3,498,677
CUTTING APPARATUS

Filed Oct. 30, 1968     5 Sheets-Sheet 1

INVENTOR.
HARRY M. MORROW

BY Woodling, Krost, Granger + Rust
attys

INVENTOR.
HARRY M. MORROW

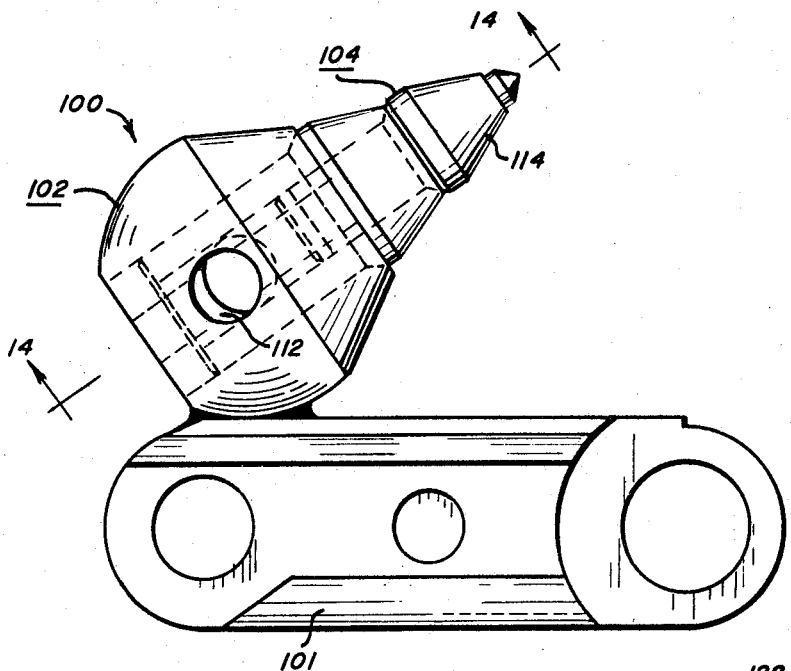
FIG. 13
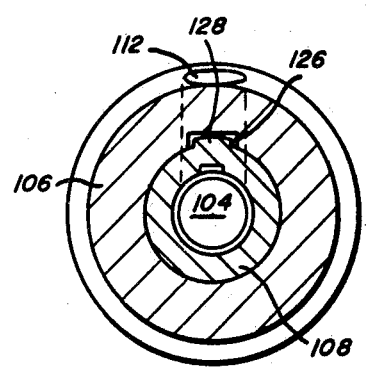
FIG. 15
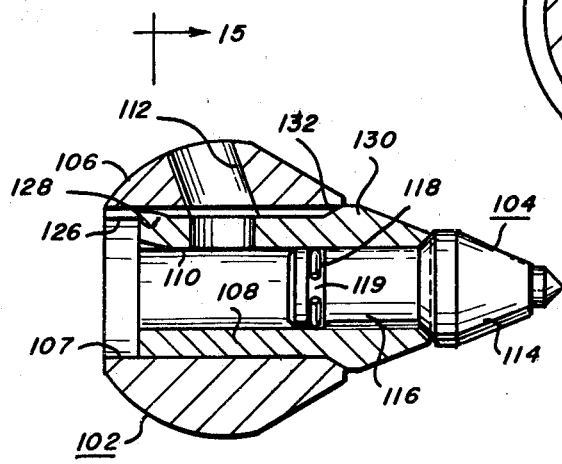
FIG. 14
INVENTOR.
HARRY M. MORROW
BY
Attys.

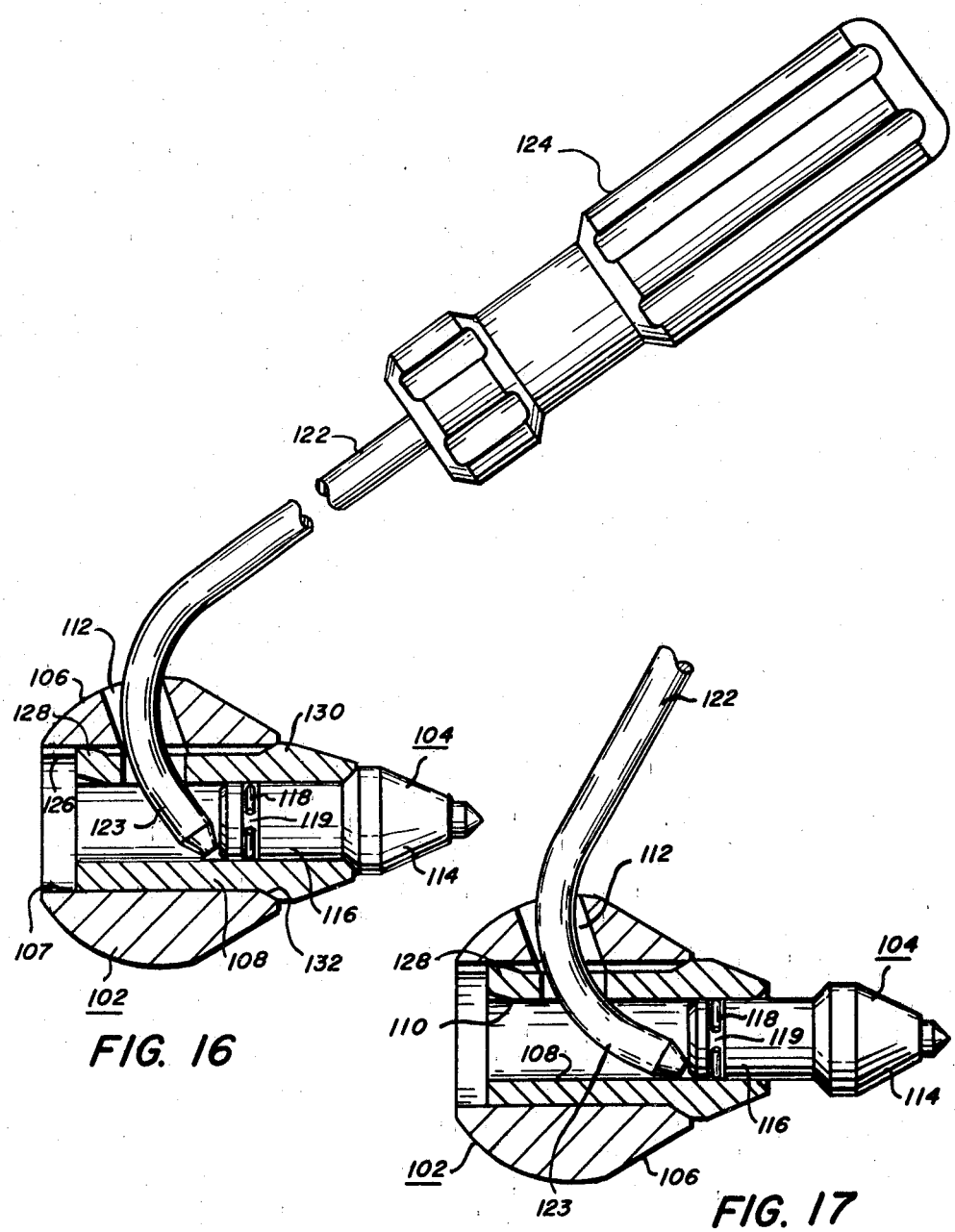

March 3, 1970 H. M. MORROW 3,498,677
CUTTING APPARATUS
Filed Oct. 30, 1968 5 Sheets-Sheet 5

INVENTOR.
HARRY M. MORROW
BY
Woodling Krost Granger+Rust
Attys.

United States Patent Office 3,498,677
Patented Mar. 3, 1970

3,498,677
CUTTING APPARATUS
Harry M. Morrow, Navarre, Ohio, assignor to The Bowdil Company, Canton, Ohio
Continuation-in-part of application Ser. No. 670,141, Sept. 25, 1967. This application Oct. 30, 1968, Ser. No. 771,782
Int. Cl. E21c 13/00
U.S. Cl. 299—86        6 Claims

ABSTRACT OF THE DISCLOSURE

Cutting apparatus primarily for use in the coal mining industry which includes in combination a bit holder and bit. The bit holder is comprised of a lug suitably secured to the chain link of a mining machine, such as by welding. The lug has an opening which extends thereinto and a bushing is fitted into the opening in the lug and is non-rotatively connected thereto by way of a key and keyway arrangement. A modification of this construction includes a pin secured to the bushing at one end and at the other end of the pin is bent into a slot in the back end of the lug. A transverse opening extends through the wall of the lug and the wall of the bushing to intersect the aforementioned opening in the bushing. The bit comprises a cutting head and a shank at the opposite end which shank resides in the first mentioned opening in the bushing and the length of the shank is such that it leaves a portion of the transverse opening uncovered. Spring and groove means act between the shank and the wall of the bushing to prevent axial removal of the bit and in turn permit rotation of the bit relative to the holder during normal operational use of the same. A variation is disclosed which prevents the aforesaid rotation of the bit when desired. The transverse opening referred to permits the insertion of a curved tool therethrough and into the first mentioned opening and, upon proper manipulation of the tool, the bit may be forcibly ejected from the bushing.

---

This application is a continuation-in-part of U.S. patent application Ser. No. 670,141, filed Sept. 25, 1967, entitled Cutting Apparatus and now abadoned, which in turn was a continuation-in-part of U.S. patent application Ser. No. 511,649, filed Dec. 6, 1965, entitled Cutting Apparatus and now abandoned.

The present invention relates in general to cutting apparatus and more particularly to such apparatus wherein a holder is adapted to carry a cutting bit and the bit is free to rotate as it travels through its cutting path.

An object of the present invention is to provide a convenient means of securing a bit in a holder which will enable the bit to rotate during operation but will not escape from the holder until sufficient force is applied by a workman.

Another object of the present invention is to provide a means for holding the shank of a bit in a holder bore or opening which permits rotation but prevents axial removal and which comprises a groove in either the shank or bore wall which groove receives an annular spring which grips the member which does not have the groove therein and does not grip the groove walls. The invention also includes the provision of an additional groove in the member opposite the one carrying the main groove which engages the spring to provide an additional force resisting axial removal of the bit from the holder.

Another object of the present invention is to provide a convenient means of preventing the rotation of the bit in the construction just referred to which comprises bending or forming the spring so that it engages the sides of the groove in which it resides.

Another object of the present invention is to provide a construction whereby a tool can be inserted behind the bit to eject it from the holder when desired.

Figure 1:
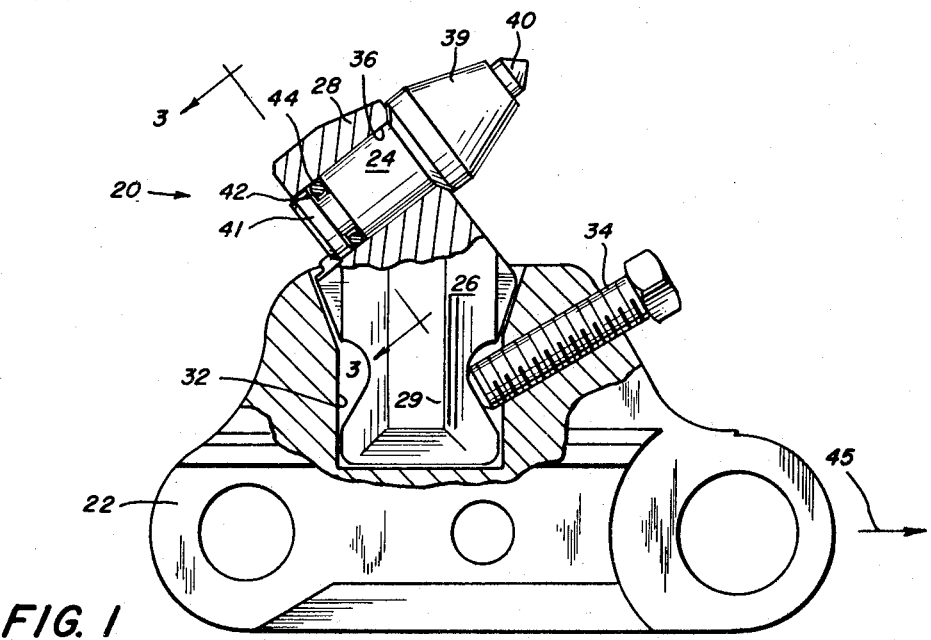
Figure 2:
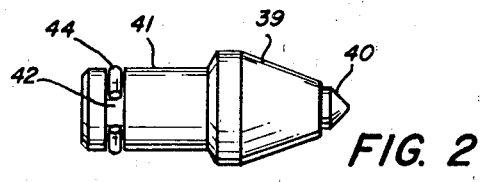
Figure 3:
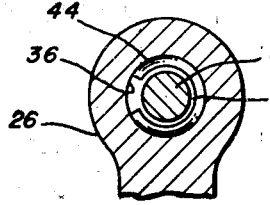
Figure 5:
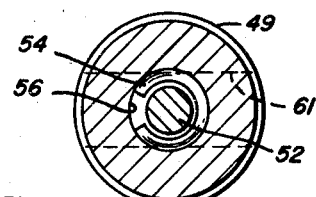
Figure 4:
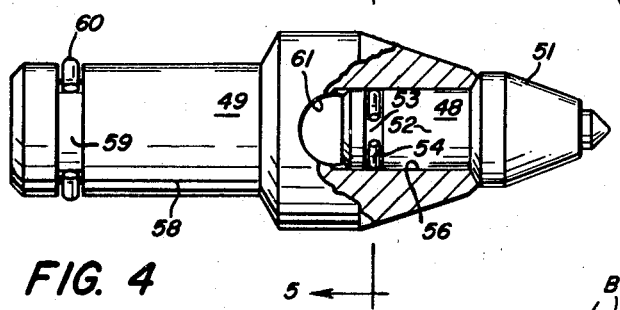
Figure 6:
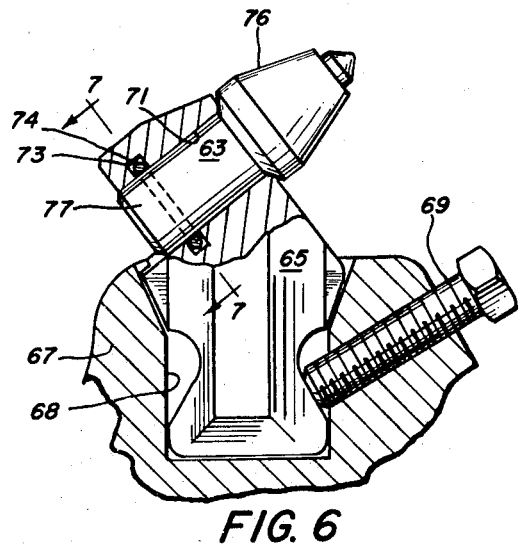
Figure 7:
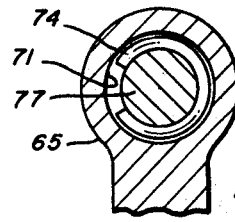
Figure 10:
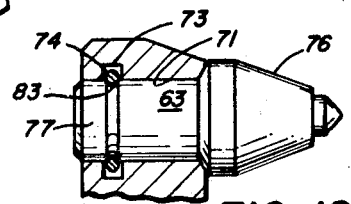
Figure 12:
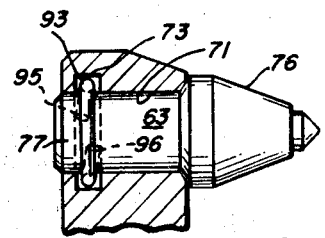
Figure 11:
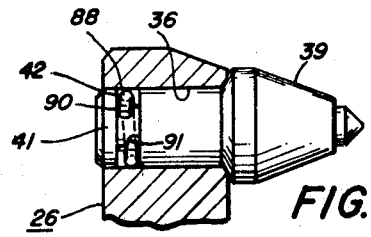
Figure 8:
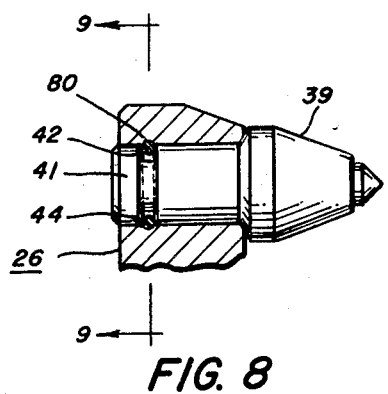
Figure 9:
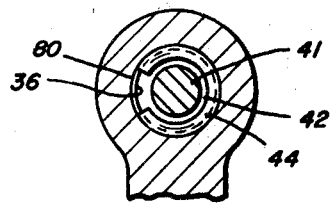
Figure 20:
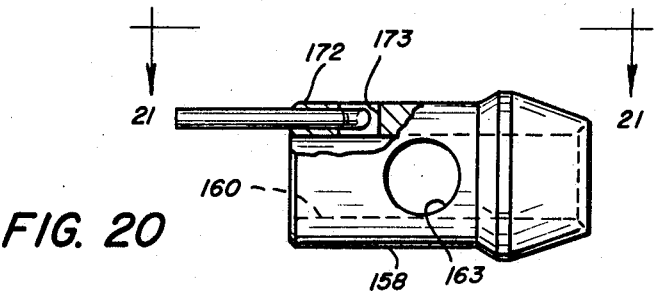
Figure 21:
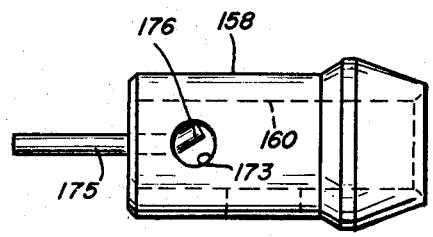
Figure 18:
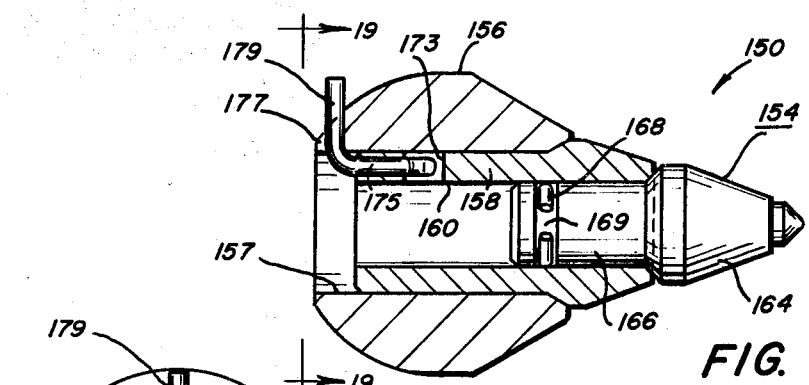
Figure 19:
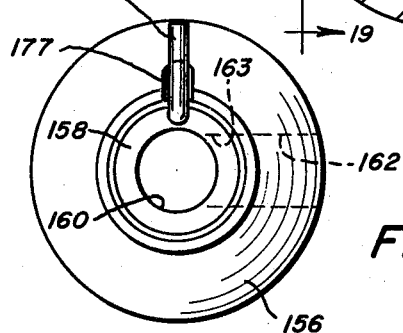

Other objects and a fuller understanding of this invention may be had by referring to the following description and claims, taken in conjunction with the accompanying drawings, in which:

FIGURE 1 is a side elevational view partially in section of the cutting apparatus of the present invention;
FIGURE 2 is an elevational view of the cutting bit shown in FIGURE 1 and removed from the holder;
FIGURE 3 is a view taken generally along the line 3—3 of FIGURE 1;
FIGURE 4 is an elevational view partially in section of a modified form of the invention;
FIGURE 5 is a view taken generally along the line 5—5 of FIGURE 4;
FIGURE 6 is an elevational view partially in section similar to FIGURE 1 but showing a further modification of the invention;
FIGURE 7 is a view taken generally along the line 7—7 of FIGURE 6;
FIGURE 8 is a fragmentary elevational view of a still further modification of the invention;
FIGURE 9 is a view taken generally along the line 9—9 of FIGURE 8;
FIGURE 10 is a view similar to FIGURE 8 but illustrating a modification of the invention;
FIGURE 11 is a fragmentary elevational view partially in section illustrating a still further modification of the invention;
FIGURE 12 is a view similar to FIGURE 11 but showing another modification;
FIGURE 13 is a side elevational view of a modification of the cutting apparatus of the present invention;
FIGURE 14 is a view taken generally along the line 14—14 of FIGURE 13;
FIGURE 15 is a view taken generally along the line 15—15 of FIGURE 14;
FIGURE 16 is an elevational view showing the use of a tool which is adapted to eject the bit from the holder;
FIGURE 17 is a view similar to FIGURE 16 but showing the tool manipulated so as to start the ejection of the bit from the holder;
FIGURE 18 is an elevational view in section of another modification of the cutting apparatus of the present invention;
FIGURE 19 is a view taken generally along the line 19—19 of FIGURE 18;
FIGURE 20 is an elevational view of the bushing shown in FIGURE 18 removed from the holder; and
FIGURE 21 is a view taken generally along the line 21—21 of FIGURE 20.

The cutting apparatus of the present invention is best seen in FIGURE 1 of the drawings and is identified generally by the reference numeral 20. In this embodiment the cutting apparatus has been shown in conjunction with a chain link 22 of a construction which is conventional, for example in the coal mining art, and this chain link as seen is provided with a socket or opening 32. The cutting apparatus 20 includes a cutting bit 24, as well as a bit holder 26. As seen, the bit holder includes first and second end portions 28 and 29, respectively, and the second end portion 29 comprises a shank or end which is received within the socket 32 and is firmly maintained in this position by means of a screw 34. Wall means are provided in the first end portion 28 of the bit holder which serve to define a cylindrical bore 36 which as seen in FIGURE 1, extends completely through the first end portion 28. The cutting bit 24 comprises a generally conical head 39 which carries a cutting point member 40 usually of carbide or other hard material and at an end opposite the cutting head is provided with a cylindrically shaped shank 41 of a size which is adapted to be received in opening 36. Wall means are provided on the shank of the bit and serve to define an annular groove 42 therein. Positioned in the annular groove 42 is an annular spring member 44, seen in FIGURES 2 and 3 in addition to FIGURE 1, and the annular spring member has a normal outside diameter when all forces are removed therefrom, which is slightly larger than the cylindrical opening 36 and also the outside diameter of the shank 41 which fits in the opening 36. The inside diameter of the annular spring member as best seen in FIGURE 3 is slightly larger than the diameter of the annular groove 42. It will therefore be seen when the shank 41 of the cutting bit is forced into the opening 36 of the holder, that the annular spring member 44 will be radially compressed thereby exerting a force against the wall of the opening 36 which tends to prevent axial removal of the cutting bit 24 during the normal use of the cutting apparatus. Since the inside diameter of the annular spring member 44 does not come in contact with the inner surface of the groove this construction permits the cutting bit to rotate in the cylindrical opening 36 and relative to the bit holder 26.

In operation the chain link 22 may, for the sake of example, be caused to travel in the direction of the arrow 45 seen in FIGURE 1 since it is connected to other links in a continuous chain and the chain is caused to travel adjacent material to be cut, for example coal or other material, and the cutting point 40 engages the material to be cut. Because of the construction of the holder and cutting bit the cutting action will case the cutting bit to rotate, resulting in better cutting action in many respects and this particular type of action has a self-sharpening effect on the point 40. The cutting bit is initially inserted in the holder by simply forcing the shank 41 axially into the opening 36 to assume the position shown in FIGURE 1. In order to remove the cutting bit from the holder a force can be applied to the end of the shank which extends through the opening 36 by way of a hammer or other device which will force the cutting bit from the holder.

FIGURES 4 and 5 illustrate an embodiment of the invention which in most respects is similar to the cutting apparatus shown in FIGURES 1 through 3 and in this embodiment there is shown a cutting bit 48 and holder 49. The bit includes a head 51 and shank 52 with the shank being received in a bore or opening 56 of the holder 49. The shank is provided with a groove 53 similar to the groove 42 and within this groove resides an annular spring member 54 which functions as in the embodiment shown in FIGURE 1. A cross hole or opening 61 is provided in the holder so as to provide access to the end of the shank 52 so that a force can be exerted on the cutting bit when it is desired to remove it from the holder.

In this particular embodiment the holder 49 is provided with a shank 58 which has a groove 59 thereon within which resides an annular spring member 60 similar to the spring member 54 but larger in size. This embodiment provides for the holding of the shank 58 of the holder in a bore or opening in a manner similar to the method which is utilized to hold the shank 52 of the cutting bit in the bore or opening 56 of the holder.

FIGURES 6 and 7 illustrate an embodiment of the cutting apparatus which in all respects is like the construction shown in FIGURES 1 through 3 with the exception that the groove and spring member are located in different positions. In this embodiment there is shown a cutting bit 63 and holder 65 in general carried by a chain link 67 which has a socket 68. A screw 69 serves to retain the holder 65 in the socket 68. The holder 65 is provided with an opening or bore 71 which receives a shank 77 of the cutting bit which bit is also provided with a conically shaped head 76 as in FIGURE 1. As mentioned above, in this embodiment there is provided in the opening or bore wall 71 a groove 73 and within this groove there is adapted to reside an annular spring member 74. The construction of the annular spring member is such that its normal inside diameter is slightly less than the outside diameter of the shank 77 and the outside diameter of the annular spring member is less than the diameter of the groove 73. As a result when the shank 77 of the cutting bit is inserted into the opening 71 the annular spring member (previously placed in the groove) is adapted to grip the shank tending to prevent axial removal of the cutting bit from the opening 71. Since the outside diameter of the annular spring member does not engage the bottom of the groove the cutting bit is permitted to conveniently rotate and as mentioned, axial removal is prevented. In this embodiment as in the embodiment of FIGURES 1 and 4, the cutting bit can be removed by exerting a force on the shank 77 of a magnitude which is higher than that which is received during normal cutting action and by this means the cutting bit can be removed.

FIGURES 8 and 9 show a construction quite similar to the embodiment shown in FIGURE 1 with the exception that provision has been made to effect a stronger holding force retaining the cutting bit shank 41 within the opening 36. This is accomplished by means of providing an additional groove 80 in the bore or opening 36 which is adapted to receive a portion of the annular spring member 44. The device functions the same as the device shown in FIGURES 1 through 3 with the exception that it takes more force to remove the cutting bit.

FIGURE 10 in most respects is similar to the construction shown in FIGURES 6 and 7 but demonstrates how the additional holding force can be acquired when the main groove is located in the bore wall. In this particular embodiment the additional groove 83 is provided in the shank 77 as distinguished from the bore wall.

FIGURE 11 is a construction which is quite similar to the construction shown in FIGURES 1 through 3, however, demonstrates a variation from this construction and different from the variation shown in FIGURE 8. This embodiment can be utilized when, for one reason or another, it is desirable not to permit the cutting bit to rotate relative to the bit holder 26. This is accomplished by providing a different type of annular spring member 88. This particular spring member is constructed so that the path it occupies is generally in a helical direction having a pitch or lead whereby portions 90 and 91 are provided which engage the side walls of the groove 42 within which it resides. As in the construction of FIGURES 1 and 8 the normal outside diameter of the spring member is such that it engages the bore wall 36 tending to retain the cutting bit from axial removal and since the portions 90 and 91 engage the sides of the groove the cutting bit is prevented from rotation. Removal of the cutting bit in this embodiment is in the same manner as that described in conjunction with FIGURE 1.

FIGURE 12 is in most respects a construction similar to the construction shown in FIGURE 6, however, with the advantages of the construction shown in FIGURE 11. In this embodiment the annular spring member 93 is carried in the groove 73 and is provided with portions 95 and 96 which engage the sides of the groove which in effect prevent rotation of the annular spring member in the groove. Since the inside diameter of the annular spring member is of a smaller diameter than the shank 77 of the cutting bit the spring member retains the cutting bit from axial removal.

The modified form of the cutting apparatus illustrated in FIGURES 13 through 17 is indicated generally by the reference numeral 100 and includes a bit holder 102 and a bit 104. The bit holder 102 is suitably secured to a link 101 of the chain of a mining machine, not illustrated, in this particular instance by welding. The bit holder 102 includes a part referred to generally as a lug or main supporting member 106 which has a bushing receiving opening 107 extending therethrough. Formed in the wall of the opening 107 is a keyway 126. A bushing 108, which is provided with a key 128, resides within the opening 107, with the key 128 residing in keyway 126 to prevent rotative movement between these two elements. As will be noted, the bushing 108 is provided with an axially extending opening which is formed by first wall means 110. Second wall means 112 define a transverse opening which extends through the wall of lug 106 as well as the wall of the bushing 108 to communicate with the opening 110, as best seen in FIGURES 14, 16 and 17.

The bit 104 includes a cutting head 114 and a shank with the shank end 116 residing in the opening 110 of the bushing 108. A groove 119 is provided on the shank of the bit and a spring 118 resides therein to appropriately secure the bit within the holder during operation of the device. This means of attachment is the same as described hereinabove in the discussion of that part of the invention disclosed in FIGURES 1 through 12.

It will be noted that the length of the shank 116 is such that it leaves the transverse opening 112 completely uncovered, and it is important that this opening be at least partially uncovered so as to provide for the insertion of an injecting tool which will be described hereinafter. It will also be noted that a shoulder 130 is provided on the bushing 108 and is adapted to engage a tapered surface 132 on the lug 106 for appropriate support of the bushing within the lug.

FIGURES 16 and 17 demonstrate the method of removal of the bit from the holder and in these figures the tool referred to is identified by the reference numeral 122. This tool is provided with a curved end 123 which can be inserted through the opening 112 as demonstrated in FIGURE 16, and then with the proper leverage exerted by way or the handle 124 the tool is moved to the position shown in FIGURE 17, and further movement causes complete removal of the bit.

The bushing 108 is highly advantageous in this particular construction in that it takes substantially all of the wear from the action of the bit and, upon failure of the bushing, it can be replaced by another bushing without resorting to replacement of the larger and more expensive lug member. It will also be noted, particularly from viewing FIGURE 13, that the cutting head 114 is essentially tapered and blends into that part of the bushing which is locateed outside of the lug and in turn this surface blends into the outside contour of the lug 108. This provides a highly advantageous design and utility from the standpointof the angle of approach of the tool to material to be cut.

A still further modified form of the cutting apparatus is illustrated in FIGURES 18 through 20 and is indicated generally by the reference numeral 150. As in the other embodiments, this cutting apparatus includes a bit 154 and a main supporting member or lug 156. The lug 156 is provided with an axially extending opening 157 and a bushing 158 is located within opening 157. The bushing 158 is also provided with an axially extending opening 160. The lug 156 and bushing 158 are provided with aligned transverse openings 162 and 163, respectively, which are for the purpose of extracting the cutting bit as heretofore described in conjunction with the disclosure in FIGURES 16 and 17.

The cutting bit 154 is provided with a head 164 and a shank 166 upon which is provided a circumferentially extending groove 169 within which resides a spring member 168. In this respect the construction is the same as disclosed in connection with FIGURE 4 of the previous drawings and the operation is the same.

An axially extending opening 172 is provided in the wall of the bushing 158 and extends into the bushing from the rear end thereof and intersects another transverse opening 173 which extends through the wall of the bushing 158 and intersects opening 172. A pin member 175 is inserted into opening 172 and after this has been done the end of the pin member which extends into opening 173 is bent as at 176, for example by driving a pin or other member into opening 173, which prevents removal of the pin member. The rear end of the lug 156 is provided with a groove 177 and after the bushing 158 has been inserted into the axially extending opening 157 in the lug, the other end of the pin member is bent into the groove as at 179 and this serves to hold the bushing from being axially removed from the lug and also prevents the bushing from rotating with respect to the lug. As noted, FIGURES 20 and 21 show the pin member inserted into opening 172 and being held in place by the bent end 176. The bushing is then inserted into the opening 157 and the other end of the pin member is bent as at 179. The bushing can be removed by the reverse procedure. This particular embodiment provides an extremely reliable and convenient means of securing the bushing in place and also enables the bushing to be readily removed without undue time and effort on the part of a workman.

It will therefore be seen that the above constructions carry out and accomplish the objects of the invention heretofore given and specifically describe a construction which facilitates ease of insertion and withdrawal of a rotating type cutting bit within its holder. This as particularly advantageous when the device is used in the coal mining industry because it does not take long for most of this equipment to become completely occluded with dirt and other material so that conventional means of holding the cutting bit in the holder are rendered quite disadvantageous. The construction shown in FIGURES 8 and 10 is a valuable additional feature for varying the axial removal force and the constructions in FIGURES 11 and 12 demonstrate how the rotating cutting head can be quickly converted to a non-rotating device.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Cutting apparatus including in combination, a main supporting member, a bushing receiving opening in said main supporting member, a bushing residing in said bushing receiving opening and having a generally axially extending opening therein, wall means defining a first generally transverse opening in said main supporting member and a second generally transverse opening in said bushing which second generally transverse opening intersects said axially extending opening, said first and second generally transverse openings being at least partially in alignment, a cutting bit comprising a cutting head at one end portion and a shank at the other end portion residing in said axially extending opening and being of a length so as to leave uncovered at least a portion of said second generally transverse opening, means acting on said bit to prevent axial removal of said bit during normal operational use of the same and which enables the bit to be forcibly ejected when desired by a tool inserted through said first and second generally transverse openings to exert an ejecting force on said shank.

2. Cutting apparatus as claimed in claim 1, wherein said means acting on said bit to prevent its removal comprises spring and groove means acting between said shank and the wall of said axially extending opening which permits rotation of said bit relative to said bushing during normal operational use.

3. Cutting apparatus as claimed in claim 1, wherein a key way is formed in said bushing receiving opening in said main supporting member and a key is formed on the outer wall of said bushing which key is located in said key way.

4. Cutting apparatus as claimed in claim 1, wherein a shoulder is provided on said bushing which engages a tapered surface at the entrance to said bushing receiving opening which limits movement of said bushing into said bushing receiving opening.

5. Cutting apparatus as claimed in claim 1, wherein a pin member extends into an axially extending opening in the wall of said bushing and is secured therein and said pin member has another end portion secured to said main supporting member to secure said bushing in place.

6. Cutting apparatus as claimed in claim 1, wherein an axially extending pin receiving opening is provided in the wall of said bushing extending thereinto from the rear end thereof and which intersects another transverse opening in said bushing, a pin member residing in said pin receiving opening and having one end bent where it intersects said another transverse opening to prevent removal thereof and having the other end thereof bent transverse to the extent of said pin receiving opening and residing in a groove in the rear end of said main supporting member.

References Cited

UNITED STATES PATENTS

| | | | |
|---|---|---|---|
| 823,640 | 6/1906 | Schulze | 279—103 |
| 1,475,136 | 11/1923 | Olson. | |
| 3,397,012 | 8/1968 | Krekeler | 299—86 |

FOREIGN PATENTS 11,197  1915  Great Britain.

ERNEST R. PURSER, Primary Examiner

U.S. Cl. X.R.

279—103; 299—92